United States Patent [19]
Husak

[11] Patent Number: 5,828,665
[45] Date of Patent: Oct. 27, 1998

[54] APPARATUS AND METHOD FOR SELECTING IMPROVED ROUTING PATHS IN AN EMULATED LAN OVER AN ATM NETWORK

[75] Inventor: David J. Husak, Windham, N.H.

[73] Assignee: 3Com Corporation, Santa Clara, Calif.

[21] Appl. No.: 807,552

[22] Filed: Feb. 28, 1997

Related U.S. Application Data

[63] Continuation-in-part of Ser. No. 641,506, May 1, 1996, Pat. No. 5,754,790.

[51] Int. Cl.$^6$ .................................................. H04L 12/50
[52] U.S. Cl. ........................................ 370/387; 370/395
[58] Field of Search ................................. 370/238, 254, 370/255, 389, 395, 400, 351, 353, 356, 251, 252, 247, 241, 908, 905, 401, 402, 404; 395/200.68, 200.69, 200.7, 200.71, 200.72

[56] References Cited

U.S. PATENT DOCUMENTS

| | | | |
|---|---|---|---|
| 5,311,584 | 5/1994 | Bogart et al. | 379/220 |
| 5,379,296 | 1/1995 | Johnson et al. | 370/60 |
| 5,430,729 | 7/1995 | Rahnema | 270/94.1 |
| 5,440,719 | 8/1995 | Hanes et al. | 395/500 |
| 5,453,980 | 9/1995 | Van Engelshoven | 370/395 |
| 5,495,479 | 2/1996 | Galaand et al. | 370/238 |
| 5,539,736 | 7/1996 | Johnson et al. | 370/60 |
| 5,557,775 | 9/1996 | Shedletsky | 395/500 |
| 5,581,552 | 12/1996 | Civanlar et al. | 370/396 |
| 5,600,644 | 2/1997 | Chang et al. | 370/404 |
| 5,636,345 | 6/1997 | Valdevit | 370/232 |

*Primary Examiner*—Dang Ton
*Assistant Examiner*—Phirin Sam
*Attorney, Agent, or Firm*—Weingarten, Schurgin, Gagnebin & Hayes LLP

[57] ABSTRACT

An apparatus and method for selecting improved routing paths in an emulated LAN over an ATM network is disclosed. Such an apparatus and method are realized by having an editor associated with a distributed LAN emulation server selectively modify Routing Information Protocol (RIP) update messages according to information retrieved from an associated routing table. More particularly, the editor modifies RIP update messages so that they will more accurately reflect the position of the network router that broadcast the RIP update message, relative to the position of a network router associated with the distributed LAN emulation server, with respect to any given destination network.

26 Claims, 5 Drawing Sheets

APPARATUS AND METHOD FOR SELECTING IMPROVED ROUTING PATHS IN AN EMULATED LAN OVER AN ATM NETWORK

CROSS-REFERENCE TO RELATED APPLICATIONS

This patent application is a continuation-in-part patent application of U.S. patent application Ser. No. 08/641,506 filed May 1, 1996; now U.S. Pat. No. 5,754,790.

FIELD OF INVENTION

The present invention relates generally to computer networks and, more particularly, to an apparatus and method for selecting improved routing paths in an emulated LAN over an ATM network.

BACKGROUND OF THE INVENTION

Local Area Network (LAN) emulation enables the implementation of an emulated LAN over an Asynchronous Transfer Mode (ATM) network. An emulated LAN provides for the communication of data frames among all of the users in the emulated LAN, similar to a physical LAN. One or more emulated LAN's may run on the same ATM network. However, each emulated LAN is independent, and users cannot communicate directly across emulated LAN boundaries. Communication between emulated LAN's is possible only through routers or bridges, which may be implemented in a common ATM end station.

An emulated LAN may be one of two types: Ethernet/IEEE 802.3 or IEEE 802.5 (Token Ring). Each emulated LAN typically comprises a single LAN Emulation Service (LE Service) and a plurality of LAN Emulation Clients (LEC's).

An LE Service comprises a LAN Emulation Configuration Server (LECS), a LAN Emulation Server (LES), and a Broadcast and Unknown Server (BUS). An LE Service may be implemented an ATM end station (e.g., a bridge, router, or dedicated workstation), or in a specific ATM network device (e.g., a switch). An LE Service may be centralized or distributed throughout an ATM network.

Each LEC is part of an ATM end station and represents one or more users, each of which is identified by a Medium Access Control (MAC) address. Each LEC performs data forwarding, address resolution, and other functions for associated ATM end station users. Each LEC must be assigned to an LE Service of an emulated LAN before it can communicate with other LEC's within the emulated LAN. Communication between LEC's and between an LEC and its assigned LE Service is performed over ATM virtual channel connections (VCC's).

An LECS implements the assignment of individual LEC's to various emulated LAN's. Based upon its own policies, configuration databases, and information provided by LEC's, an LECS assigns any LEC which requests configuration information to a particular LE Service. The LECS assigns an LEC to a particular LE Service by giving the LEC the ATM address of an LES associated with that particular LE Service, along with other necessary operating parameters. The LECS provides the ATM address of the LES to the LEC over a configuration VCC which is established between the LECS and the LEC.

An LES implements the control coordination function for an emulated LAN. That is, an LES provides a facility for registering MAC addresses and/or route descriptors, and for resolving MAC addresses and/or route descriptors to ATM addresses. An LEC will register the users that it represents with the LES to which it is assigned. An LEC will also query its assigned LES when the LEC wishes to resolve an MAC address and/or route descriptor to an ATM address. The LES will either respond directly to the LEC which initiated the query or forward the query to other LEC's so that they may respond. An LEC communicates with its assigned LES over control VCC's which are established between the LEC and the LES.

An LES always exists with a BUS in an emulated LAN. A BUS handles all broadcast, multicast, and unknown data traffic to and from an LEC. That is, all broadcast, multicast, and unknown data traffic to and from an LEC passes through a BUS. A BUS receives and delivers this data traffic through multicast VCC's which are established between the BUS and each associated LEC. Multicast VCC's are established between a BUS and an associated LEC after the ATM address of the BUS is provided to the LEC by its assigned LES in an address resolution procedure.

Since an LES and a BUS always coexist in an emulated LAN, they may be coupled together into a combined LES/BUS server. In order to minimize the utilization of ATM network resources in an emulated LAN, a plurality of LES/BUS servers, or LES/BUS subservers, may be distributed throughout an ATM network. In such a case, each LEC is assigned to a "local" LES/BUS subserver, and the appropriate VCC's are established between each LEC and its local LES/BUS subserver. It should be noted that VCC's are also established between the LES/BUS subservers.

An LEC which represents a router will periodically send a Routing Information Protocol (RIP) update message to its local LES/BUS subserver over an established VCC so that the RIP update message may be distributed to other components within the emulated LAN. An RIP update message, which is always initiated by a router, contains network routing information regarding the router that initiated the RIP update message. It should be noted that RIP update messages are broadcast messages and, as such, must be handled by the BUS component of a local LES/BUS subserver. It should also be noted that RIP update messages are actually part of multicast data frames which are sent over established VCC's in an emulated LAN.

Each RIP update message contains information taken from a routing table of the router that initiated the RIP update message, and comprises a message pair that contains a destination network address and an integer distance between the router that initiated the RIP update message and the destination network address. A hop count metric is used to measure the integer distance, wherein a router is defined to be one hop from directly connected networks, two hops from networks that are reachable through one other router, and so on. Thus, the number of hops, or the hop count, along a routing path from a given source to a given destination refers to the number of routers that a data packet will encounter while traveling along that routing path.

Certain network elements, such as hosts and routers, receive RIP update messages and update their routing tables accordingly so that eventually all hosts and routers will have stored in their routing tables a routing path to any given network. However, some of these routing paths may not be the most efficient routing path in terms of the utilization of network resources. For example, RIP specifies that once a network element learns a route from another network element, it must keep that route until it learns of a better one. In other words, to prevent a router or host from oscillating between two or more equally efficient (equal cost) routing paths, RIP specifies that existing routing paths should be retained until a new routing path having a lower hop count is available. However, since RIP only takes into account routers when determining the hop count of a routing path, other network elements, such as bridges and switches, are not considered. Thus, it is possible that the advertised routing paths of two or more routers, although having the same hop count, are not equally efficient in terms of the utilization of network resources.

In view of the foregoing, it should be apparent that the particular aspect of RIP wherein hop counts are used to calculate the shortest path distance between a given source and a given destination does not always produce optimal, or even near optimal, results in an emulated LAN since some network elements, such as bridges and switches, and their associated delays, are not taken into account when determining the hop counts. Thus, it would be desirable to provide an apparatus and method for selecting improved routing paths in an emulated LAN over an ATM network.

SUMMARY OF THE INVENTION

In accordance with the present invention, an apparatus and method for selecting improved routing paths in an emulated LAN over an ATM network is disclosed. The apparatus and method are realized by having an editor associated with a distributed LAN emulation server selectively modify Routing Information Protocol (RIP) update messages according to information retrieved from an associated routing table. More particularly, the editor modifies RIP update messages so that they will more accurately reflect the position of the network router that broadcast the RIP update message, relative to the position of a network router associated with the distributed LAN emulation server, with respect to any given destination network. Thus, the presently disclosed apparatus and method essentially take other network elements, such as bridges and switches, into account when determining the best possible routing paths within an ATM network. As a consequence, more direct routing paths are typically utilized and unnecessary delays through some network elements, such as bridges and switches, are avoided.

BRIEF DESCRIPTION OF THE DRAWINGS

The present invention will be more fully understood by reference to the detailed description of the invention in conjunction with the appended drawings of which.

DETAILED DESCRIPTION OF THE INVENTION

Figure 1:
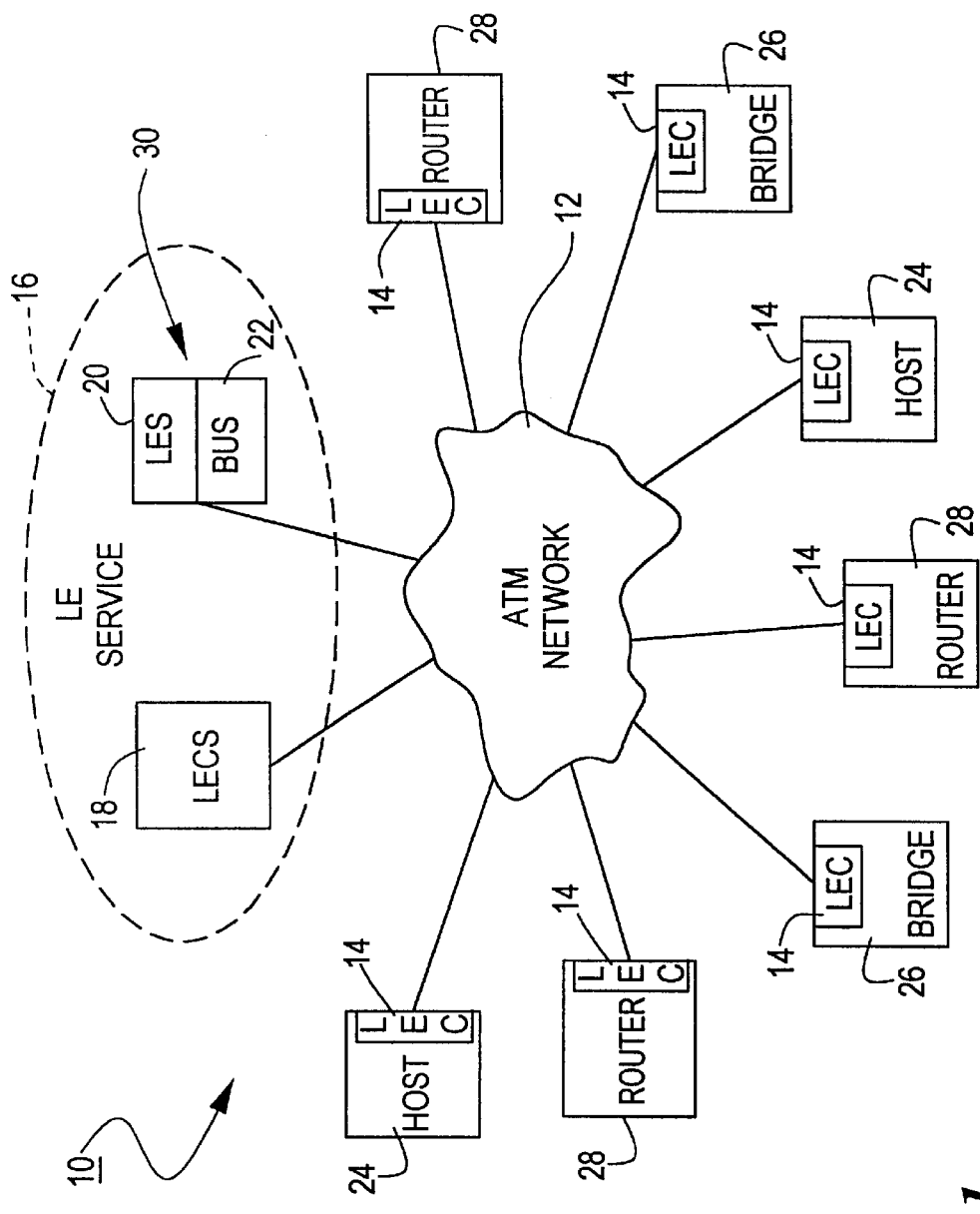
FIG. 1 is a block diagram illustrating a prior art topology of a typical emulated LAN over an ATM network.

Referring to FIG. 1, a block diagram is provided illustrating the topology of a prior art emulated Local Area Network (LAN) 10 over an Asynchronous Transfer Mode (ATM) network 12. The emulated LAN 10 comprises a plurality of LAN Emulation Clients (LEC's) 14 and a single LAN Emulation Service (LE Service) 16. Each LEC 14 is a part of an ATM end station which may comprise a host 24, a bridge 26, or a network router 28. The LE Service 16 comprises a LAN Emulation Configuration Server (LECS) 18, a LAN Emulation Server (LES) 20, and a Broadcast and Unknown Server (BUS) 22. It should be noted that the LES 20 and the BUS 22 are shown coupled together as a combined LES/BUS server 30 because they always coexist in an emulated LAN.

Figure 2:
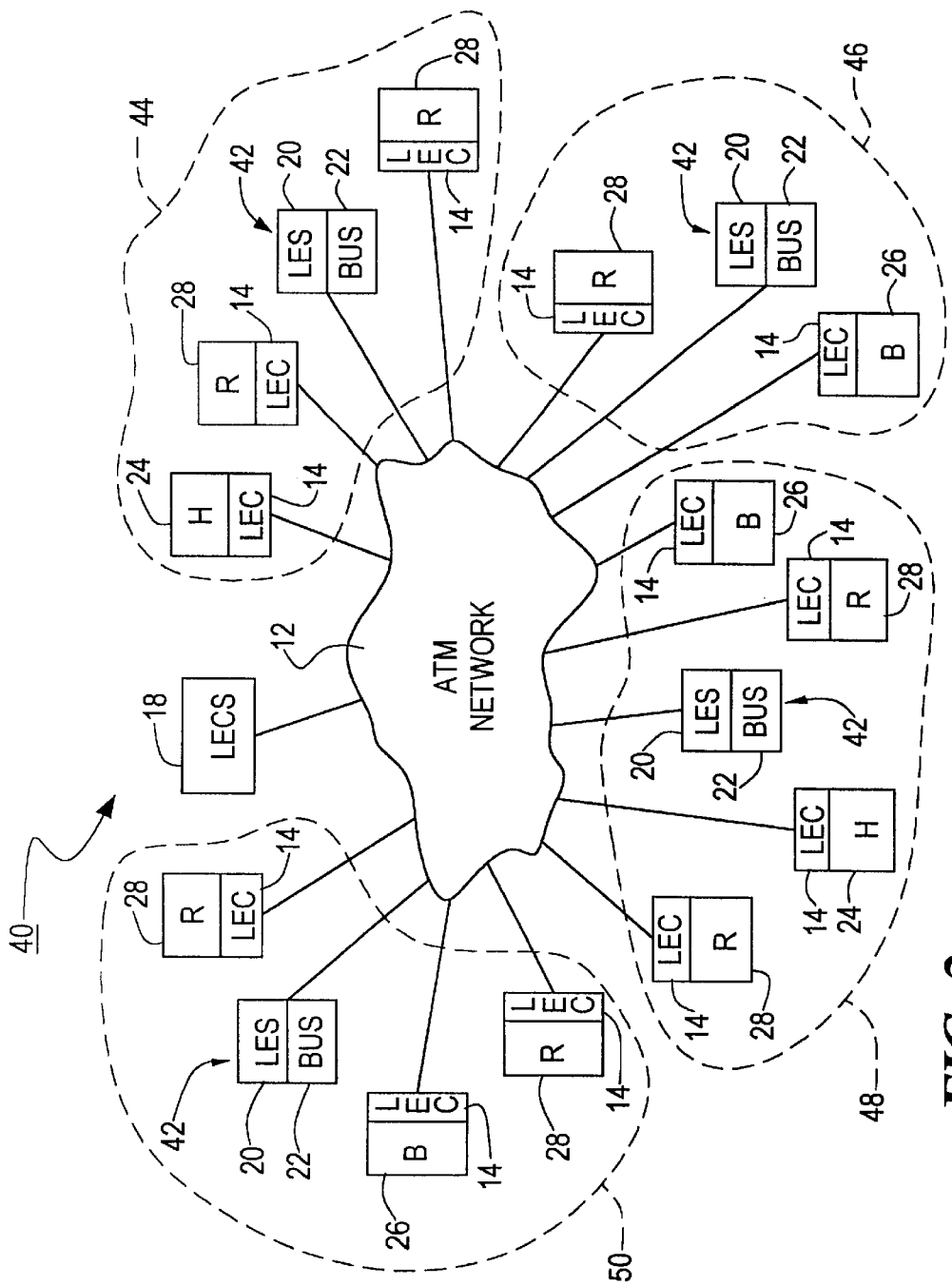
FIG. 2 is a block diagram illustrating a prior art topology of an emulated LAN having a plurality of LES/BUS subservers distributed throughout an ATM network.

To minimize resource utilization in the ATM network 12, it is possible to distribute a plurality of the LES/BUS servers 30 throughout the ATM network 12, and to assign each LEC 14 to a "local" LES/BUS server 30. For example, referring to FIG. 2, an emulated LAN 40 is shown with a plurality of LES/BUS subservers 42 distributed throughout the ATM network 12. Each LEC 14 is typically assigned to a local LES/BUS subserver 42, thereby forming a corresponding plurality of LES/BUS subserver groups 44, 46, 48, and 50. The LES/BUS subservers 42 in the LES/BUS subserver groups 44, 46, 48, and 50 operate in a manner that is similar to the LES/BUS server 30 described above, but they result in less utilization of resources in the ATM network 12 since messages sent between LEC's 14 and local LES/BUS subservers 42 are required to travel shorter distances through the ATM network 12.

Figure 3:
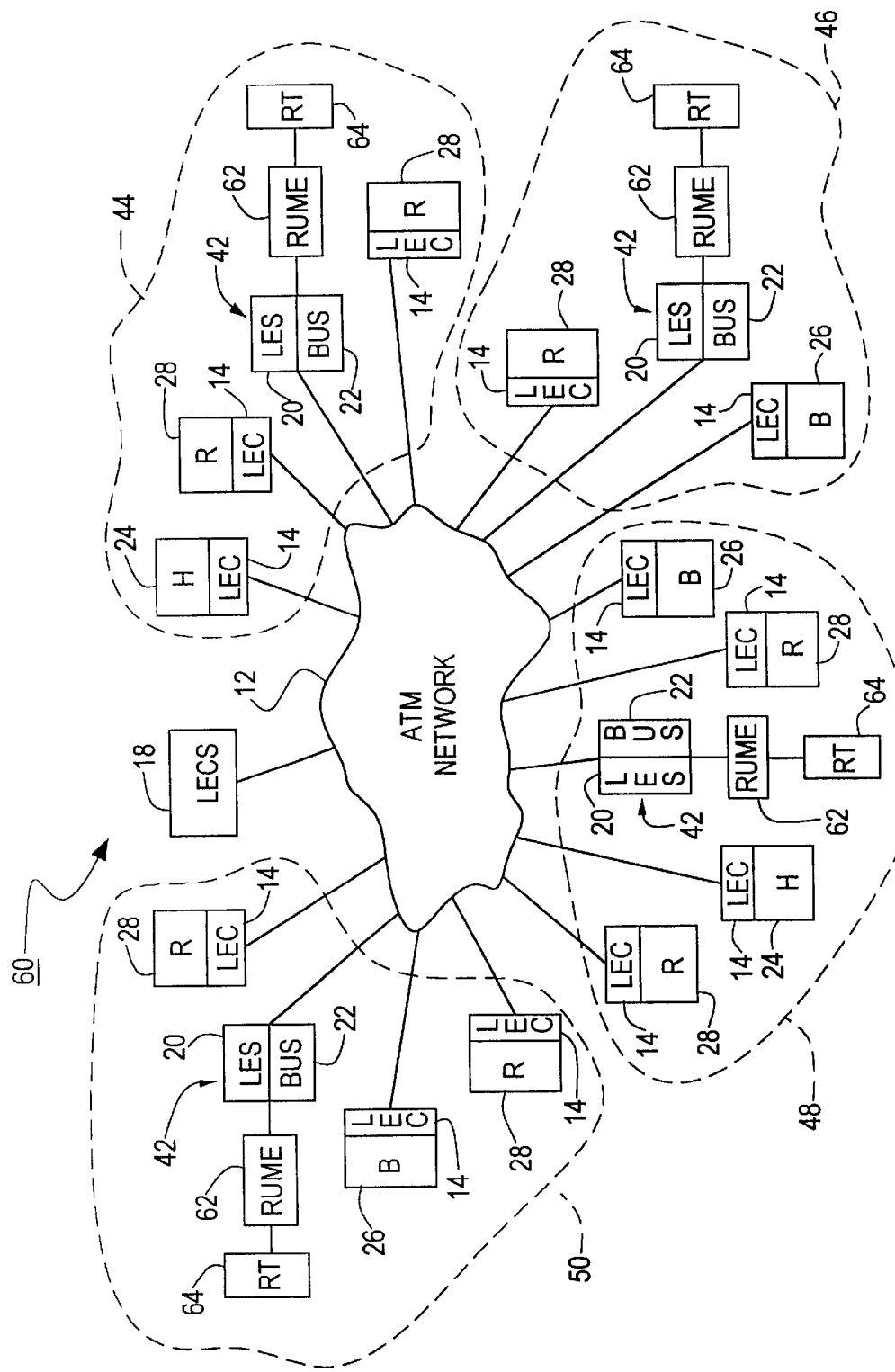
FIG. 3 is a block diagram illustrating the topology of an emulated LAN having a plurality of LES/BUS subservers distributed throughout an ATM network along with a corresponding plurality of associated RIP update message editors and associated routing tables in accordance with the present invention.

To further minimize resource utilization in the ATM network 12, the present invention provides an apparatus and method for selectively modifying Routing Information Protocol (RIP) update messages which are received by and then transmitted from LES/BUS subservers 42. More particularly, and with reference to FIG. 3, an emulated LAN 60 having a plurality of LES/BUS subservers 42 is shown wherein each of the LES/BUS subservers 42 has an associated RIP Update Message Editor (RUME) 62 and an associated Routing Table (RT) 64 for selectively modifying RIP update messages which are received by and then transmitted from an associated LES/BUS subserver 42. It should be noted that, except as otherwise described below, the emulated LAN 60 operates in the manner defined in the specification entitled, LAN Emulation Over ATM, Version 1.0, The ATM Forum Technical Committee, January, 1995, which is hereby incorporated by reference.

Each LEC 14 in the emulated LAN 60 is assigned to an LES 20 and a BUS 22 of a local LES/BUS subserver 42 during an initialization phase. During this initialization phase, each LEC 14 is provided with the ATM address of its assigned LES 20 and BUS 22, and virtual channel connections (VCC's) are established between each LEC 14 and its assigned LES 20 and BUS 22. After this initialization phase is completed, each LEC 14 which represents a router 28 will periodically send a Routing Information Protocol (RIP) update message to its local LES/BUS subserver 42 over an established VCC so that the RIP update message may be distributed to other components within the emulated LAN 60. As described below, an RIP update message, which is always initiated by a router 28, contains network routing information regarding the router 28 that initiated the RIP update message.

It should be noted that RIP update messages are broadcast messages and, as such, must be handled by the BUS component 22 of a local LES/BUS subserver 42. It should also be noted that RIP update messages are actually part of multicast data frames which are sent over established VCC's in the emulated LAN 60.

The VCC's which are established between each LEC 14 and its local LES/BUS subserver 42 include a multicast point-to-point VCC and a multicast point-to-multipoint VCC. The multicast point-to-point VCC allows an LEC 14 to send multicast data frames containing RIP update messages to its local LES/BUS subserver 42. The multicast point-to-multipoint VCC allows an LES/BUS subserver 42 to distribute multicast data frames containing RIP update messages to all of the "local" LEC's 14 within a particular LES/BUS subserver group 44, 46, 48, or 50. It should be noted that the multicast point-to-multipoint VCC may alternatively be provided by one or more multicast point-to-point VCC's at the discretion of the LE Service 16.

In addition to the above-described VCC's, an interserver point-to-multipoint VCC is established for each LES/BUS subserver 42 within the emulated LAN 60. This interserver point-to-multipoint VCC allows each LES/BUS subserver 42 to distribute multicast data frames containing RIP update messages to other LES/BUS subservers 42 within the emulated LAN 60. These other LES/BUS subservers 42 may then use a multicast point-to-multipoint VCC to distribute the multicast data frames to all of the "local" LEC's 14 within their particular LES/BUS subserver group 44, 46, 48, or 50. However, before these other LES/BUS subservers 42 distribute the multicast data frames to their "local" LEC's 14, the RIP update messages contained in the multicast data frames may be modified by the RUME 62 and the RT 64 associated with each LES/BUS subserver 42 in accordance with the present invention.

Figure 4:
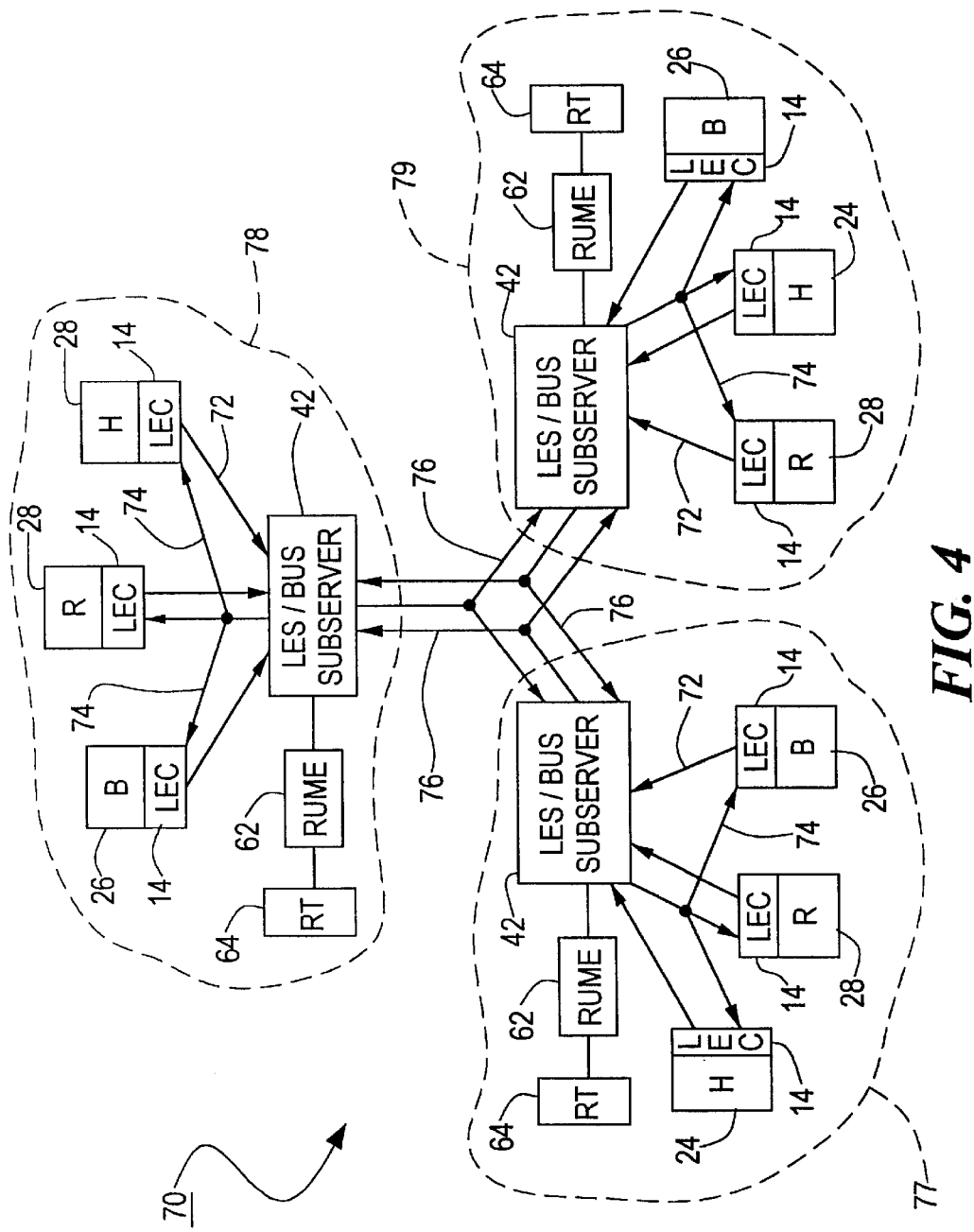
FIG. 4 is a block diagram illustrating the various VCC's which are established between each LEC and its local LES/BUS subserver in an emulated LAN.

Referring to FIG. 4, an emulated LAN 70 is shown illustrating the various VCC's which are established between each LEC 14 and its local LES/BUS subserver 42. A multicast point-to-point VCC 72 is directed from each LEC 14 to its local LES/BUS subserver 42, and a multicast point-to-multipoint VCC 74 is directed from each LES/BUS subserver 42 to all of the "local" LEC's 14 within a corresponding LES/BUS subserver group 77, 78, or 79. An inter-server point-to-multipoint VCC 76 is directed from each LES/BUS subserver 42 to every other LES/BUS subserver 42 within the emulated LAN 70. These inter-server point-to-multipoint VCC's 76 allow each LES/BUS subserver 42 to distribute multicast data frames containing RIP update messages to other LES/BUS subservers 42 within the emulated LAN 60. These other LES/BUS subservers 42 may then use a multicast point-to-multipoint VCC 74 to distribute the multicast data frames to all of the "local" LEC's 14 within a corresponding LES/BUS subserver group 77, 78, or 79. However, before these other LES/BUS subservers 42 distribute the multicast data frames to their "local" LEC's 14, the RIP update messages contained in the multicast data frames may be modified by the RUME 62 and the RT 64 associated with each LES/BUS subserver 42 in accordance with the present invention.

As described in related U.S. patent application Ser. No. 08/641,506, which was filed May 1, 1996, and which is hereby incorporated by reference, each RIP update message contains information taken from a routing table of the network router that initiated the RIP update message, and includes at least one message pair containing a destination network address and an integer distance between the network router that initiated the RIP update message and the destination network address. A hop count metric is used to measure the integer distance, wherein a network router is defined to be one hop from directly connected networks, two hops from networks that are reachable through one other network router, and so on. Thus, the number of hops, or the hop count, along a routing path from a given source to a given destination refers to the number of network routers that a data packet will encounter while traveling along that routing path.

Certain network elements, such as hosts and routers, receive RIP update messages and update their routing tables accordingly so that eventually all network hosts and routers will have stored in their routing tables a routing path to any given network. However, some of these routing paths may not be the most efficient routing path in terms of the utilization of network resources. For example, RIP specifies that once a network element learns a route from another network element, it must keep that route until it learns of a better one. In other words, to prevent a network host or router from oscillating between two or more equally efficient (equal cost) routing paths, RIP specifies that existing routing paths should be retained until a new routing path having a lower hop count is available. However, since RIP only takes into account network routers when determining the hop count of a routing path, other network elements, such as bridges and switches, are not considered. Thus, it is possible that the advertised routing paths of two or more network routers, although having the same hop count, are not equally efficient in terms of the utilization of network resources. The major factor in determining such network resource utilization efficiency is the location of the network routers within the network system.

The above-referenced related patent application addressed the above-described problem by providing a network bridge for selectively modifying RIP update messages according to information retrieved from a routing table of an associated network router. More particularly, a network bridge was provided to selectively modify RIP update messages so that the RIP update messages more accurately reflect the position of the network router that initiated a particular RIP update message, relative to the position of the network router associated with the network bridge, with respect to any given destination network. In the case of the emulated LAN 60 shown in FIG. 3, an LES/BUS subserver 42 is provided having an associated RUME 62 for selectively modifying RIP update messages according to information retrieved from an associated RT 64. More particularly, an RUME 62 in association with an RT 64 are provided to selectively modify RIP update messages so that the RIP update messages more accurately reflect the position of the LEC 14, and hence the network router 28, that sent a particular RIP update message, relative to the position of the LES/BUS subserver 42 that is associated with the RUME 62 and the RT 64, and hence relative to the position of any LEC's 14 and network routers 28 that are "local" to the LES/BUS subserver 42 that is associated with the RUME 62 and the RT 64, with respect to any given destination network. In this manner, the utilization of network resources is reduced by having "local" ATM end stations (i.e., end stations within a particular LES/BUS subserver group 44, 46, 48, or 50) utilize the routing paths provided by "local" network routers 28, rather than routing paths provided by other network routers 28 within the emulated LAN 60.

At this point it should be noted that each RT 64 typically includes entries for all destination networks, and each entry typically includes a hop count value for a "local" network router 28.

When an LES/BUS subserver 42 receives an RIP update message from a "local" LEC 14, the RUME 62 associated with the LES/BUS subserver 42 will update, if necessary, the associated RT 64. That is, if the RT 64 does not have an initial entry for a routing path from a given source to a given destination, and the newly received RIP update message indicates that a "local" network router 28 can provide such a routing path, then the RUME 62 will update the RT 64 by adding an entry to the RT 64 which specifies that the "local" network router 28 can provide that routing path within a certain number of hop counts. Also, if the hop count for a routing path from a given source to a given destination may be improved (e.g., a lower hop count routing path may be provided) in view of information contained in the newly received RIP update message, then the RUME 62 will update the RT 64 by modifying the appropriate routing path entry in the RT 64 to reflect the improved routing path which can be provided by the "local" network router 28.

After an LES/BUS subserver 42 receives an RIP update message from a "local" LEC 14, the LES/BUS subserver 42 forwards the RIP update message to the other "local" LEC's 14 within the particular LES/BUS subserver group 44, 46, 48, or 50, and to other LES/BUS subservers 42 within the emulated LAN 60. The other "local" LEC's 14 within the particular LES/BUS subserver group 44, 46, 48, or 50 will provide the RIP update message directly to their associated end stations. The other LES/BUS subservers 42 within the emulated LAN 60, however, will utilize their associated RUME's 62 and RT's 64 to selectively modify the RIP update message so that it more accurately reflects the position of the LEC 14, and hence the network router 28, that sent the RIP update message, relative to the position of these other LES/BUS subservers 42, and hence relative to the position of any LEC's 14 and network routers 28 that are "local" to these other LES/BUS subservers 42, with respect to any given destination network. That is, each RUME 62 will compare the contents of the RIP update message to the contents of their associated RT 64 and selectively modify the contents of the RIP update message. More specifically, the RUME 62 will compare the hop count values that are contained in the associated RT 64 with the hop count values that are contained in message pairs within the RIP update message for each destination network and selectively modify the contents of the RIP update message.

If the value of a hop count in a message pair in the RIP update message for any given destination network is not equal to the value of a hop count in the RT 64 for a corresponding destination network, then the RUME 62 will not modify that message pair in the RIP update message and the associated LES/BUS subserver 42 will forward the RIP update message without modification of that message pair to all of the "local" LEC's 14 within the particular LES/BUS subserver group 44, 46, 48, or 50. If, on the other hand, the value of a hop count in a message pair in the RIP update message for any given destination network is equal to the value of a hop count in the RT 64 for a corresponding destination network, then the RUME 62 will modify the RIP update message by increasing the value of the hop count in that particular message pair and the associated LES/BUS subserver 42 will forward the modified RIP update message to all of the "local" LEC's 14 within the particular LES/BUS subserver group 44, 46, 48, or 50. In other words, the RUME 62 will modify the RIP update message so that it will more accurately reflect the position of the LEC 14, and hence the network router 28, that sent the RIP update message, relative to the position of the LES/BUS subserver 42 that is associated with the RUME 62 and the RT 64, and hence relative to the position of any LEC's 14 and network routers 28 that are "local" to the LES/BUS subserver 42 that is associated with the RUME 62 and the RT 64, with respect to any given destination network. The actual value to which the hop counts are increased need only be greater than the corresponding hop counts in the RT 64.

Figure 5:
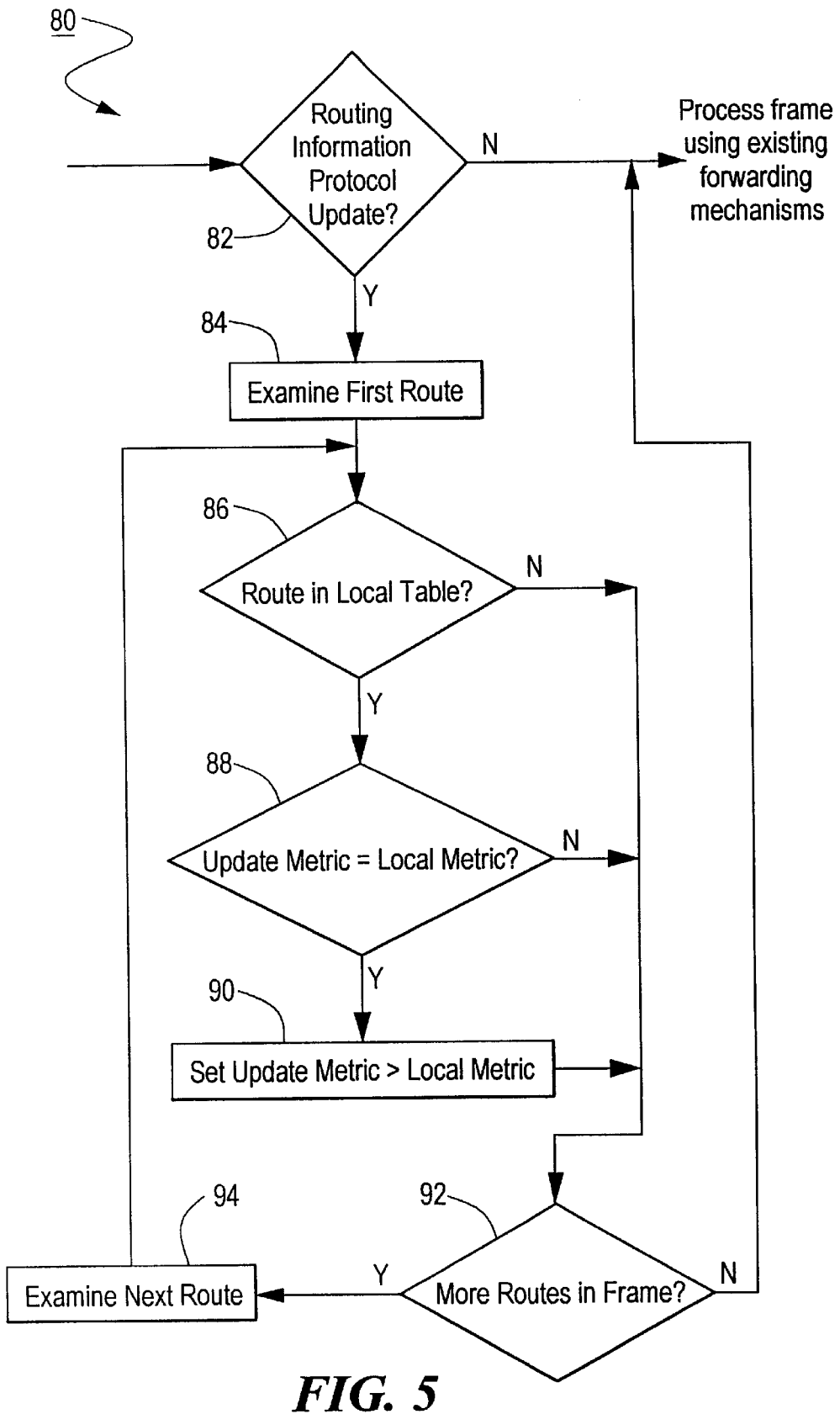
FIG. 5 is a flowchart illustrating an RIP update message modification method in accordance with the present invention.

FIG. 5 illustrates the various steps of a method 80 for modifying an RIP update message in accordance with the present invention. In a first step 82, an RIP message is received by an LES/BUS subserver from another LES/BUS subserver and a determination is made by the receiving LES/BUS subserver as to whether such an RIP message is an RIP update message. It should be noted that this first step 82, as well as all of the subsequent steps, are performed by a single LES/BUS subserver along with an associated RUME and RT.

If the RIP message is not an RIP update message, the LES/BUS subserver processes and forwards the RIP message in a manner consistent with typical emulated LAN operation. If, on the other hand, the RIP message is an RIP update message, then, in a second step 84, a first message pair in the RIP update message is examined by the RUME. In a third step 86, a determination is made by the RUME as to whether or not a routing path is listed in the associated RT for the destination network address contained in the first message pair. If there is no routing path listed in the associated RT for the destination network address contained in the first message pair, then the method 80 directs skipping to a subsequent sixth step 92, which is described below. If, on the other hand, there is a routing path listed in the associated RT for the destination network address contained in the first message pair, then, in a fourth step 88, a comparison is made between the value of the hop count that is contained in the associated RT and the value of the hop count that is contained in the RIP update message. If the value of the hop count in the RIP update message is not equal to the value of the hop count in the RT, then the method 80 directs skipping to the sixth step 92, which, again, is described below. If, on the other hand, the value of the hop count in the RIP update message is equal to the value of the hop count in the RT, then, in a fifth step 90, the value of the hop count in the RIP update message is modified by the RUME by increasing the value of the hop count in the RIP update message.

Once the modification in the fifth step 90 is completed, then, in the sixth step 92, a determination is made by the RUME as to whether there are more message pairs in the RIP update message. If there are no more message pairs in the RIP update message, then the LES/BUS subserver processes and forwards the RIP update message in a manner consistent with typical emulated LAN operation. That is, the LES/BUS subserver forwards the modified RIP update message to all of the "local" LEC's within the particular LES/BUS subserver group. If, on the other hand, there is at least one more message pair in the RIP update message, then, in a seventh step 94, the next message pair in the RIP update message is examined by the RUME and processed in the manner described above with respect to steps 86 through 92.

It will be understood by those of ordinary skill in the art that other embodiments and variations on the presently disclosed apparatus and method may be envisioned without departing from the inventive concepts disclosed herein. Accordingly, the present invention is not to be viewed as limited, except in accordance with the scope and spirit of the appended claims.

What is claimed is:

1. A method for selecting routing paths in an emulated LAN over an ATM network, said method comprising the steps of:

receiving an update message from a first distributed emulated LAN server at a second distributed emulated LAN server, said update message comprising a destination network address and a first integer distance between an origination routing network element and said destination network address, said second distributed emulated LAN server having an associated update message editor which has access to routing information of an associated network routing element, said routing information comprising said destination network address and a second integer distance between said associated network routing element and said destination network address, said first integer distance being measured by a first number of network routing elements located along a first route from said origination network routing element to said destination network address, said second integer distance being measured by a second number of network routing elements located along a second route from said associated network routing element to said destination network address;

comparing said first integer distance with said second integer distance;

if said first number of network routing elements is not equal to said second number of network routing elements, forwarding said update message without modification to LAN emulation clients associated with said second distributed emulated LAN server; and if said first number of network routing elements is equal to said second number of network routing elements, modifying said update message by increasing the value of said first integer distance.

2. The method as defined in claim 1, further comprising the steps of:

after modifying said update message, determining if said update message comprises any further destination network addresses and any further integer distances between said origination network routing element and said further destination network addresses; and performing said step of comparing, and all subsequent steps, on said further integer distances.

3. The method as defined in claim 2, further comprising the step of:

if said update message does not comprise any further destination network addresses and any further integer distances between said origination network routing element and said further destination network addresses, forwarding said modified update message to the LAN emulation clients associated with said second distributed emulated LAN server.

4. A method for selecting routing paths in an emulated LAN over an ATM network, said method comprising the steps of:

receiving an update message from a first distributed emulated LAN server at a second distributed emulated LAN server, said update message comprising a destination network address and a first integer distance between an origination network routing element and said destination network address, said second distributed emulated LAN server having an associated update message editor which has access to routing information of an associated network routing element, said routing information comprising said destination network address and a second integer distance between said associated network routing element and said destination network address, said first integer distance and said second integer distance being measured by a first number of network routing elements and a second number of network routing elements situated between said origination network routing element and said associated network routing element, respectively, and said destination network address;

comparing said first integer distance with said second integer distance;

if said first number of network routing elements is not equal to said second number of network routing elements, forwarding said update message without modification to LAN emulation clients associated with said second distributed emulated LAN server; and if said first number of network routing elements is equal to said second number of network routing elements, modifying said update message by increasing the value of said first integer distance and then forwarding said modified update message to LAN emulation clients associated with said second distributed emulated LAN server.

5. The method as defined in claim 4, further comprising the steps of:

after modifying said update message, determining if said update message comprises any further destination network addresses and any further integer distances between said origination network routing element and said further destination network addresses; and performing said step of comparing, and all subsequent steps, on said further integer distances.

6. The method as defined in claim 5, further comprising the step of:

if said update message does not comprise any further destination network addresses and any further integer distances between said origination network routing element and said further destination network addresses, forwarding said modified update message to the LAN emulation clients associated with said second distributed emulated LAN server.

7. A method for selecting routing paths in an emulated LAN over an ATM network, said method comprising the steps of:

receiving an update message from a first distributed emulated LAN server at a second distributed emulated LAN server, said update message comprising a destination network address and a first integer distance between an origination network routing element and said destination network address, said second distributed emulated LAN server having an associated update message editor which has access to routing information of an associated network routing element, said routing information comprising said destination network address and a second integer distance between said associated network routing element and said destination network address, said first integer distance and said second integer distance being measured by numbers of network routing elements situated between said origination network routing element and said associated network routing element, respectively, and said destination network address;

comparing said first integer distance with said second integer distance;

if said first integer distance is not equal to said second integer distance, forwarding said update message without modification to LAN emulation clients associated with said second distributed emulated LAN server; and if said first integer distance is equal to said second integer distance, modifying said update message by increasing the value of said first integer distance and then forwarding said modified update message to LAN emulation clients associated with said second distributed emulated LAN server.

8. The method as defined in claim 7, further comprising the steps of:

after modifying said update message, determining if said update message comprises any further destination network addresses and any further integer distances between said origination network routing element and said further destination network addresses; and performing said step of comparing, and all subsequent steps, on said further integer distances.

9. The method as defined in claim 8, further comprising the step of:

if said update message does not comprise any further destination network addresses and any further integer distances between said origination network routing element and said further destination network addresses, forwarding said modified update message to the LAN emulation clients associated with said second distributed emulated LAN server.

10. An apparatus for selecting routing paths in an emulated LAN over an ATM network, said apparatus comprising:

a first distributed emulated LAN server for receiving an update message from a second distributed emulated LAN server, said update message comprising a destination network address and a first integer distance between an origination network routing element and said destination network address, said first integer distance being measured by a first number of network routing elements located along a first route from said origination network routing element to said destination network address; and an update message editor associated with said first distributed emulated LAN server, said update message editor having access to routing information of an associated network routing element, said routing information comprising said destination network address and a second integer distance between said associated network routing element and said destination network address, said second integer distance being measured by a second number of network routing elements located along a second route from said associated network routing element to said destination network address, said update message editor comparing said first integer distance with said second integer distance and selectively modifying said update message by increasing the value of said first integer distance if said first number of network routing elements is equal to said second number of network routing elements.

11. The apparatus as defined in claim 10, wherein said first distributed emulated LAN server forwards said update message without modification to LAN emulation clients associated with said first distributed emulated LAN server if said first number of network routing elements is not equal to said second number of network routing elements.

12. The apparatus as defined in claim 10, wherein said update message editor determines if said update message comprises any further destination network addresses and any further integer distances between said origination network routing element and said further destination network addresses after modifying said update message.

13. The apparatus as defined in claim 12, wherein said first distributed emulated LAN server forwards said modified update message to the LAN emulation clients associated with said first distributed emulated LAN server if said update message does not comprise any further destination network addresses and any further integer distances between said origination network routing element and said further destination network addresses.

14. An apparatus for selecting routing paths in an emulated LAN over an ATM network, said apparatus comprising:

a first distributed emulated LAN server for receiving an update message from a second distributed emulated LAN server, said update message comprising a destination network address and a first integer distance between an origination network routing element and said destination network address, said first integer distance being measured by a first number of network routing elements situated between said origination network routing element and said destination network address; and an update message editor associated with said first distributed emulated LAN server, said update message editor having access to routing information of an associated network routing element, said routing information comprising said destination network address and a second integer distance between said associated network routing element and said destination network address, said second integer distance being measured by a second number of network routing elements situated between said associated network routing element and said destination network address, said update message editor comparing said first integer distance with said second integer distance and selectively modifying said update message by increasing the value of said first integer distance if said first number of network routing elements is equal to said second number of network routing elements.

15. The apparatus as defined in claim 14, wherein said first distributed emulated LAN server forwards said update message without modification to LAN emulation clients associated with said first distributed emulated LAN server if said first number of network routing elements is not equal to said second number of network routing elements.

16. The apparatus as defined in claim 14, wherein said update message editor determines if said update message comprises any further destination network addresses and any further integer distances between said origination network routing element and said further destination network addresses after modifying said update message.

17. The apparatus as defined in claim 16, wherein said first distributed emulated LAN server forwards said modified update message to the LAN emulation clients associated with said first distributed emulated LAN server if said update message does not comprise any further destination network addresses and any further integer distances between said origination network routing element and said further destination network addresses.

18. An apparatus for selecting routing paths in an emulated LAN over an ATM network, said apparatus comprising:

a first distributed emulated LAN server for receiving an update message from a second distributed emulated LAN server, said update message comprising a destination network address and a first integer distance between an origination network routing element and said destination network address, said first integer distance being measured by numbers of network routing elements situated between said origination network routing element and said destination network address;

an update message editor associated with said first distributed emulated LAN server, said update message editor having access to routing information of an associated network routing element, said routing information comprising said destination network address and a second integer distance between said associated network routing element and said destination network address, said second integer distance being measured by the numbers of network routing elements situated between said associated network routing element and said destination network address, said update message editor comparing said first integer distance with said second integer distance and selectively modifying said update message by increasing the value of said first integer distance if said first integer distance is equal to said second integer distance.

19. The apparatus as defined in claim 18, wherein said first distributed emulated LAN server forwards said update message without modification to LAN emulation clients associated with said first distributed emulated LAN server if said first integer distance is not equal to said second integer distance.

20. The apparatus as defined in claim 18, wherein said update message editor determines if said update message comprises any further destination network addresses and any further integer distances between said origination network routing element and said further destination network addresses after modifying said update message.

21. The apparatus as defined in claim 20, wherein said first distributed emulated LAN server forwards said modified update message to the LAN emulation clients associated with said first distributed emulated LAN server if said update message does not comprise any further destination network addresses and any further integer distances between said origination network routing element and said further destination network addresses.

22. A method for selecting improved routing paths in an emulated LAN over an ATM network, said method comprising the step of modifying an update message from a first distributed emulated LAN server at a second distributed emulated LAN server, said update message comprising a destination network address and a first integer distance between an origination network routing element and said destination network address, said second distributed emulated LAN server having an associated update message editor which has access to routing information of an associated network routing element, said routing information comprising said destination network address and a second integer distance between said associated network routing element and said destination network address, said step of modifying comprising increasing the value of said first integer distance over the value of said second integer distance so as to more accurately reflect the position of said origination network routing element, relative to the position of said associated network routing element, with respect to said destination network address.

23. An apparatus for selecting improved routing paths in an emulated LAN over an ATM network, said apparatus comprising a update message editor for modifying an update message from a first distributed emulated LAN server at a second distributed emulated LAN server, said update message comprising a destination network address and a first integer distance between an origination network routing element and said destination network address, said update message editor having access to routing information of an associated network routing element, said routing information comprising said destination network address and a second integer distance between said associated network routing element and said destination network address, said update message editor modifying said update message by increasing the value of said first integer distance over the value of said second integer distance so as to more accurately reflect the position of said origination network routing element, relative to the position of said associated network routing element, with respect to said destination network address.

24. A method for selecting improved routing paths in an emulated LAN having:

a first distributed emulated LAN server;

a second distributed emulated LAN server for transmitting an update message from an origination network routing element to said first distributed emulated LAN server, wherein said update message comprises a destination network address and a first integer distance between said origination network routing element and said destination network address; and an update message editor associated with said first distributed emulated LAN server, said update message editor having access to routing information of an associated network routing element, said routing information comprising said destination network address and a second integer distance between said associated network routing element and said destination network address;

said method comprising the step of modifying the value of said first integer distance based upon a comparison of said first integer distance with said second integer distance.

25. The method of claim 24, wherein said first integer distance and said second integer distance are measured by a first number of network routing elements and a second number of network routing elements situated between said origination network routing element and said associated network routing element, respectively, and said destination network address.

26. The method of claim 25, wherein said modifying step includes the step of increasing said first integer distance if the value of said first integer distance is equal to the value of said second integer distance.

* * * * *